// United States Patent [15] 3,687,462
Sherwood [45] Aug. 29, 1972

[54] RECORDING ATTACHMENT FOR A PHOTOGRAPH AND THE LIKE

[72] Inventor: Henry A. Sherwood, Short Hills, N.J.
[73] Assignee: Lorraine Industries, Inc., Bridgeport, Conn.

[22] Filed: Nov. 21, 1969
[21] Appl. No.: 878,621
[52] U.S. Cl. ................................274/9 D, 274/46 R
[51] Int. Cl. ..........................G11b 3/00, G11b 25/04
[58] Field of Search .............274/1 R, 9 R, 9 D, 46 R

[56] References Cited

UNITED STATES PATENTS

| | | | |
|---|---|---|---|
| 2,326,667 | 8/1943 | Morrison | 274/9 D |
| 3,485,501 | 12/1969 | Baker | 274/23 R |

*Primary Examiner*—Leonard Forman
*Assistant Examiner*—Steven L. Stephan
*Attorney*—March, Le Fever & Wyatt

[57] ABSTRACT

A recording attachment partly self-supporting and partly supported and oriented by the turntable of a regular playback phonograph to permit recording on pre-grooved disks. The attachment includes a recording transducer sound-isolated by rubber grommets or the like and mounted on the same structure with a microphone and an amplifier.

15 Claims, 5 Drawing Figures

INVENTOR.
HENRY A. SHERWOOD
BY
Marsh, Le Fever & Wyatt
ATTORNEYS

INVENTOR.
HENRY A. SHERWOOD
BY
March, LeFever & Wyatt
ATTORNEYS

RECORDING ATTACHMENT FOR A PHOTOGRAPH AND THE LIKE

FIELD OF THE INVENTION

This invention relates to means for changing a playback phonograph into one capable of making records as well. In particular, the invention relates to a self-contained unit to be attached to a phonograph and comprising support means and a recording head, or transducer pivotally mounted on the support to follow a prescribed path with respect to the record.

BACKGROUND OF THE INVENTION

The concept of a combined unit that has both recording and playback capability has long been known to be a useful one. Heretofore such units have been constructed with the recording and playback components as parts of an integrated structure. This has meant that anyone desiring to have a machine capable of making records had to purchase the complete machine and could not attach a recording unit to an ordinary playback phonograph for the dual purpose. It has been found that it is frequently desirable to record messages, such as letters, memorandum, and the like, sometimes in locations removed from the place in which one would normally have a combined recording and playback phonograph but where a playback phonograph, alone, would be available.

The present invention permits the recording attachment to be purchased separately so that it can be used with an existing phonograph. The whole unit is self-contained and does not draw either electrical or substantial mechanical power from the phonograph. Moreover the unit is compact and can easily be carried around wherever it may be desired.

BRIEF DESCRIPTION OF THE INVENTION

The invention comprises an attachment for phonographs to permit records to be made on pre-grooved disks. The attachment comprises a support on which a microphone, an amplifier, and a recording head and arm are mounted. Preferably the unit also includes its own power supply in the form of batteries. Because both the input electro-acoustical device (the microphone) and the output electro-acoustical device (the recording head) are physically attached to the same structure, it is necessary to provide sound-insulating, or sound-isolating, means between them to prevent acoustical feedback which would produce oscillations. For this purpose the arm for the recording head is mounted on rubber grommets or the like, and the recording head is attached to the arm through the medium of additional rubber grommets.

The recording unit must be located with respect to the turntable of the phonograph so that the recording head will move in the proper geometrical path in making a record. The location of the recording unit is accomplished by means of a journal that fits over the spindle of the phonograph. In order not to impose any greater power load than necessary on the phonograph, the journal is preferably of low friction material such as Teflon. The other end of the unit may be supported by legs that can be folded up to make it more convenient to carry the unit around.

BRIEF DESCRIPTION OF THE DRAWINGS

The invention will be described in greater detail in connection with the drawings in which.

DETAILED DESCRIPTION OF THE DRAWINGS

Figure 1:
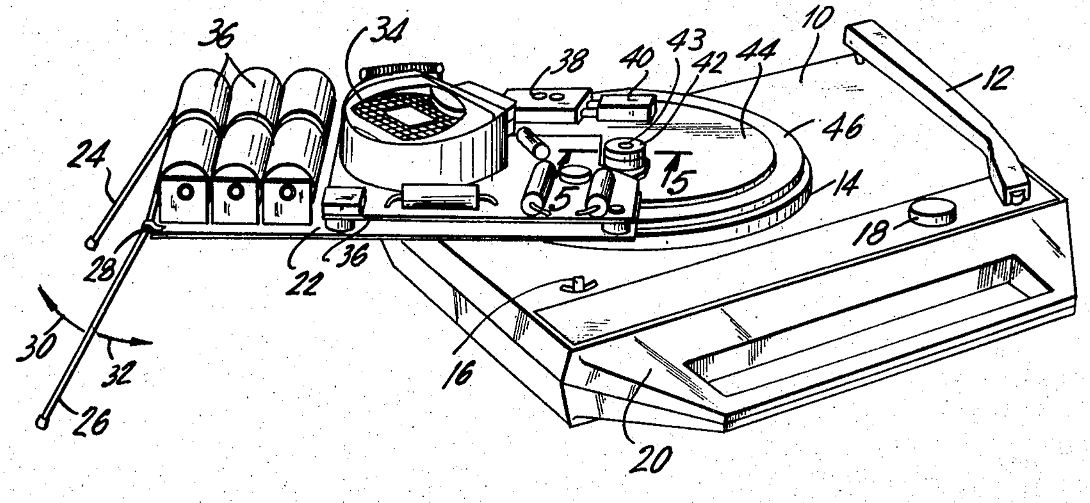
FIG. 1 is a perspective view of a phonograph with a recording attachment constructed according to the invention.

The apparatus shown in FIG. 1 comprises a regular playback phonograph case generally designated as 10, which in this instance is a portable unit and operated by batteries, although it may be operated from alternating current. The phonograph case mounts a pick-up arm 12, a turntable 14 with a speed control 16, and a volume control 18 that also includes the on-off switch. The phonograph case has a handle 20 by which it may be carried around.

The attachment that comprises the present invention includes a support 22 in the form of a more or less rectangular plate having a pair of legs 24 and 26 pivotally attached to the support by means of a pair of loops, one of which is identified by reference numeral 28. The legs 24 and 26 may be pivoted back and forth as indicated by the arrows 30 and 32 to adjust the height of one end of the support 22 to accommodate phonographs of different height, since the turntable must not rub against the support 22.

A microphone 34 is mounted on a subchassis 36 attached to the support. This subchassis also has the electrical components for a recording amplifier, which may be of conventional type. The amplifier may be operated from an alternating source, if a rectifier is included, but in order to be completely portable, it is desirable to attach a set of batteries 36 to the support 22 to serve as a self-contained power supply for the recording unit.

A recording arm 38 is pivotally mounted on the support 22, and a recording head, or cutter, or transducer, 40 is attached to the arm 38. The support 22 is positioned with respect to the turntable 14 by means of an annular bearing 42 that has a central opening 43 that slips over a spindle (not shown in FIG. 1). This bearing locates the support 22 with respect to the center of the turntable 14 and establishes the proper geometrical relationship between the recording head 40 and a record 44 on the turntable 14.

Figure 2:
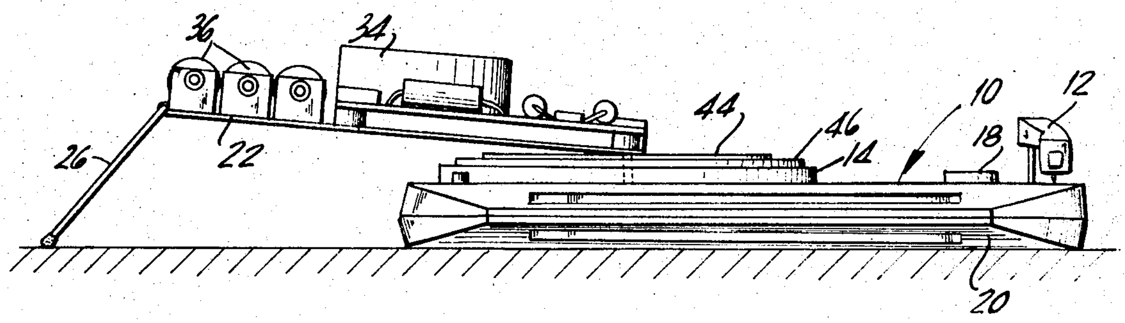
FIG. 2 is a side view of the phonograph and recording attachment of FIG. 1.

FIG. 2 is a side view of the apparatus of FIG. 1 and illustrates the fact that the support 22 is tilted at a slight angle with respect to the plane of the record 44 and the turntable 14. FIG. 2 also shows a sound-cushioning disk 46 that may include means to assure that the record 44 does not slip with respect to the turntable 14 but rotates at exactly the same speed. Alternatively, or in addition, a pin or other means may be built into the turntable to lock into a hole in the record to prevent slippage. The slight tilt in the support 22 assures that the support clears the rotating record 44 and the turntable and will not drag on the surface of the record.

Figure 3:
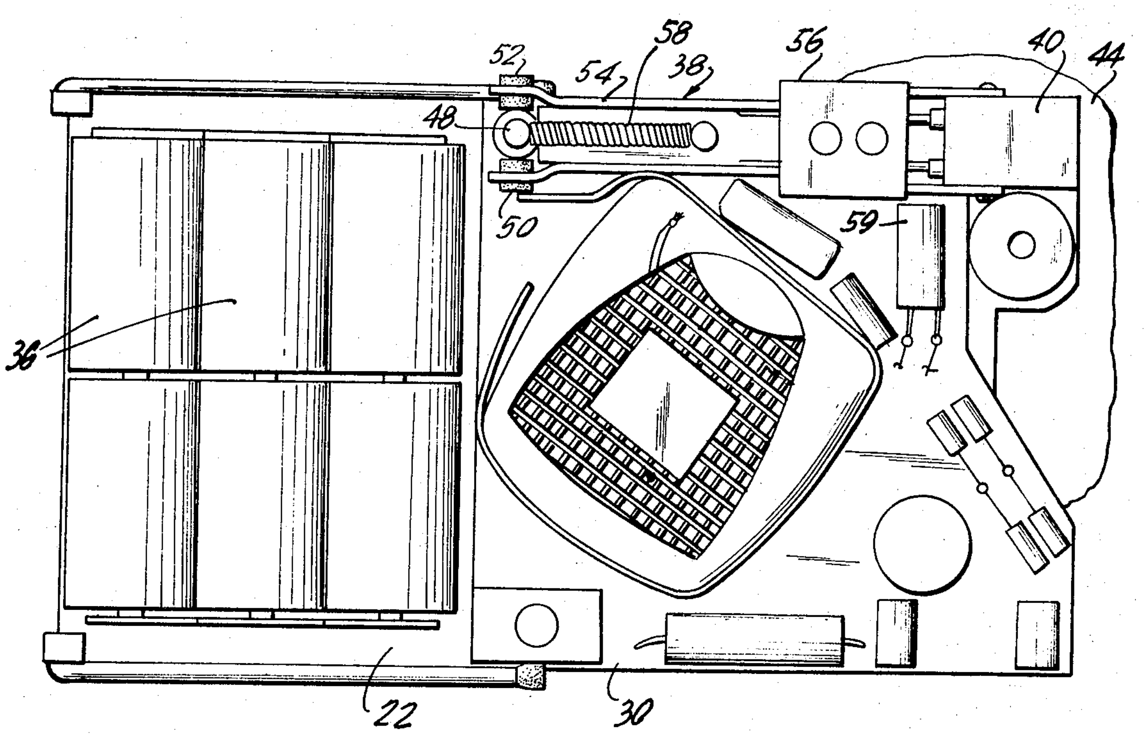
FIG. 3 is a plan view of the recording attachment of FIG. 1.

FIG. 3 shows in greater detail the mounting arrangement for the recording arm 38. The arm is pivotally mounted about an axle 48 perpendicular to the plane of the support 22. This permits the arm 38 to pivot back and forth to follow the embossed grooves in the record 44. Means in the form of a pair of stub axles, or arms, extend laterally from the vertical axle 48. These lateral axles are enclosed by rubber grommets 50 and 52 (FIG. 4) that fit into holes in the arm 38. This provides sound-isolating means between the arm 38 and the support 22 and allows vertical pivoting movement of the arm. The main part of the arm is a U-shaped channel 54 that terminates in a somewhat wider portion 56. One end of a spring 58 is attached to the axle 48 and the other end to the channel 54 to provide the force to compensate for part of the weight of the arm and the recording head 40 so as to allow the recording stylus to press upon the record with the proper force.

A microswitch 59 is located on the support 22 adjacent to the arm 38 to be actuated when the arm is in the position shown, which is the storage position. In this position the recording head 40 is not in contact with the record and therefore it is unnecessary for the amplifier that connects the microphone 34 to the recording head 40 to be energized by the batteries 36. The microswitch turns off the battery power when actuated by contact with the arm 38.

Figure 4:
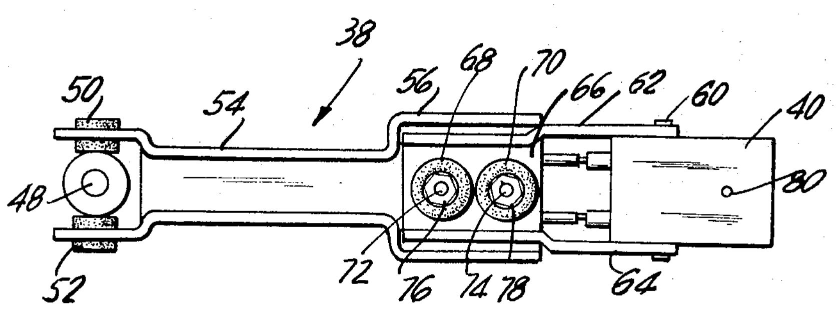
FIG. 4 shows the underside of the recording head and arm of FIG. 3.

FIG. 4 shows the underside of the arm 38 and the recording head 40. The recording head is attached by means of a rivet 60 to the extended sides 62 and 64 of a U-shaped channel member 66 that fits into the enlarged end 56 of the arm 38. In order to provide additional sound-isolating means, a pair of rubber grommets 68 and 70 are used to cushion the channel member 66 from the enlarged portion 56. A pair of machine screws 72 and 74 with nuts 76 and 78, respectively, extend through the enlarged portion 56 and through the grommets 68 and 70. In this way the recording head 40 with its embossing stylus 80 are isolated from the microphone 34 to an even greater extent than would be possible by means of the grommets 50 and 52 alone, yet the isolation is accomplished with quite inexpensive grommets rather than soft elastic members specially formed to fit the arm 38.

Figure 5:
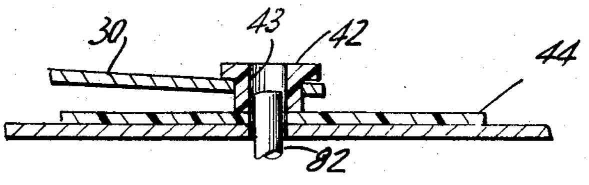
FIG. 5 is a cross sectional view of a fragment of the structure shown in FIG. 2 to illustrate the positioning bearing and its location on the spindle and on the recording unit.

FIG. 5 shows, in greater detail, the arrangement of the bearing 42 that locates the recording attachment with respect to the center of the record 44. This view shows the upper end of the spindle 82 at the center of the record and turntable. As may be seen, the central opening 43 in the bearing 42 fits over the upper end of the spindle 82 and the lower surface of the bearing 42 rests on the record 44. It is desirable to minimize the frictional force exerted by the bearing on the spindle and on the record. At the same time it is important that the bearing have good dimensional stability and wearing qualities because of its importance in properly positioning the recording attachment. A suitable material for the bearing is Teflon, which may be rather easily formed to the proper dimensions and which exerts very little frictional drag on either the record 44 or the spindle 82.

What is claimed is:

1. A recording attachment freely mountable on and removable from a phonograph case having a turntable and a spindle, said attachment comprising a support; said support including a bearing which releasably engages said spindle and locates said support with respect to said spindle; additional means for said support which cooperates with said bearing to hold said support in mounted position on said phonograph case; a recording head; and a carrier arm pivotally attached to said support and carrying said recording head.

2. The recording attachment of claim 1, in which the phonograph case has a playback arm; said support being constructed to receive the spindle and having contours providing clearance for cooperation of said recording head with a record on the turntable and providing clearance of the playback arm of the phonograph case with a record on the turntable.

3. The recording attachment of claim 1, in which said supporting means and said bearing provide a three - point support for said recording attachment.

4. The recording attachment of claim 1, in which said support is adjustable to various heights with respect to the overall height of the phonograph.

5. The recording attachment of claim 1 comprising, in addition, a microphone on said support; and sound-isolating means between said microphone and said recording head to prevent acoustical feedback from said recording head to said microphone.

6. The invention as defined in claim 5 in which said sound-isolating means comprises resilient grommets between said arm and said support.

7. The recording attachment of claim 1 including a switch for operation of the recording means, said switch being operated by movement of the carrier arm.

8. The recording attachment of claim 1 including as component parts of the attachment, a microphone, an amplifier and a power source.

9. The recording attachment of claim 8 in which all component parts of the attachment are at substantially equal distance above the support.

10. The recording attachment of claim 1 in which said carrier arm has pivotal means, including sound-isolating means, at one end whereby said carrier arm is pivotally attached to said support.

11. The recording attachment of claim 1 in which said bearing comprises a low-friction annular member having a central opening to fit rotatably over said spindle.

12. The recording attachment of claim 11 in which said annular member is located adjacent one end of said support and said additional supporting means are located adjacent the opposite end of said support.

13. A recording attachment for a phonograph case having a turntable and a spindle, said attachment comprising a support; a bearing attached to said support to engage said spindle to locate said support with respect to said spindle; additional means to hold said support with respect to said phonograph case; a recording head; a carrier arm pivotally attached to said support and carrying said recording head; said additional supporting means comprising adjustable legs to hold said support with respect to said phonograph case so that only said bearing engages said turntable.

14. The recording attachment of claim 13 in which said legs are pivotally attached to said support.

15. A recording attachment for a phonograph having a turntable and a spindle, said attachment comprising a support; a bearing attached to said support to engage said spindle to locate said support with respect to said spindle; additional means to hold said support with respect to said phonograph; a recording head; a carrier arm pivotally attached to said support and carrying said recording head; sound-isolating means, in the form of resilient grommets, between said arm and said support; a pivot axle attached to said support comprising stub axles extending laterally therefrom, said grommets being attached to said laterally extending stub axles, and said carrier arm engaging said grommets.

* * * * *